US012138911B2

(12) United States Patent
Lores Garcia et al.

(10) Patent No.: US 12,138,911 B2
(45) **Date of Patent: *Nov. 12, 2024**

(54) PRINTING DEVICE WITH MODULAR ASSEMBLY INCLUDING ELASTIC ELEMENTS

(71) Applicant: Hewlett-Packard Development Company, L.P., Spring, TX (US)

(72) Inventors: Eduard Lores Garcia, Sant Cugat del Valles (ES); Martin Urrutia Nebreda, Sant Cugat del Valles (ES); Andres Cano de la Fuente, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,947

(22) Filed: Sep. 11, 2023

(65) Prior Publication Data

US 2023/0415503 A1 Dec. 28, 2023

Related U.S. Application Data

(63) Continuation of application No. 17/418,803, filed as application No. PCT/US2019/043072 on Jul. 23, 2019, now Pat. No. 11,787,208.

(51) Int. Cl.

*B41J 15/16* (2006.01)
*B65H 23/188* (2006.01)

(Continued)

(52) U.S. Cl.

CPC .......... *B41J 15/165* (2013.01); *B65H 23/188* (2013.01); *B41J 15/18* (2013.01);

(Continued)

(58) Field of Classification Search

CPC ....... B41J 15/165; B41J 15/18; B65H 23/188; B65H 23/26; B65H 2301/4473; B65H 2801/36

See application file for complete search history.

(56) References Cited

U.S. PATENT DOCUMENTS

| | | | | |
|---|---|---|---|---|
| 5,417,413 | A | 5/1995 | Huffman et al. | |
| 11,787,208 | B2 * | 10/2023 | Lores Garcia | B65H 23/188 347/104 |

(Continued)

FOREIGN PATENT DOCUMENTS

| | | | |
|---|---|---|---|
| CN | 106488068 | A | 3/2017 |
| EP | 1634715 | A1 | 3/2006 |

*Primary Examiner* — Henok D Legesse

(74) *Attorney, Agent, or Firm* — Jordan IP Law, LLC

(57) ABSTRACT

A printing device and method is described comprising: controlling movement of a printing medium along a printing medium path to position the printing medium relative to at least one printhead to allow printing on the printing medium by the at least one printhead; and applying a plurality of respective elastic forces in a direction substantially perpendicular to the printing medium path, wherein the respective elastic forces are applied by a plurality of elastic elements of a modular assembly arranged laterally across a width of the printing medium path, wherein the printing medium acts against the elastic forces of the respective elastic elements of the modular assembly.

11 Claims, 11 Drawing Sheets

(51) Int. Cl.
*B41J 15/18* (2006.01)
*B65H 23/26* (2006.01)

(52) U.S. Cl.
CPC ...... *B65H 23/26* (2013.01); *B65H 2301/4473* (2013.01); *B65H 2801/36* (2013.01)

(56) References Cited

U.S. PATENT DOCUMENTS

| | | | |
|---|---|---|---|
| 2004/0135872 | A1 | 7/2004 | Burdenko |
| 2006/0070536 | A1 | 4/2006 | Lim |
| 2008/0251991 | A1 | 10/2008 | Doyo |
| 2009/0060613 | A1 | 3/2009 | Matsuda et al. |
| 2011/0211031 | A1 | 9/2011 | Satoh et al. |
| 2012/0044309 | A1 | 2/2012 | Wanibuchi et al. |
| 2015/0022606 | A1 | 1/2015 | Hasegawa et al. |
| 2016/0325561 | A1 | 11/2016 | Sasaki et al. |
| 2017/0344842 | A1 | 11/2017 | Pérez Muñoz et al. |

* cited by examiner

PRINTING DEVICE WITH MODULAR ASSEMBLY INCLUDING ELASTIC ELEMENTS

CROSS-REFERENCE TO RELATED APPLICATIONS

The present application is a continuation of U.S. patent application Ser. No. 17/418,803 (filed on Jun. 26, 2021), which is a National Stage Entry of PCT/US2019/043072 (filed Jul. 23, 2019), all of which are hereby incorporated by reference in their entirety.

BACKGROUND

In some printing devices, printing media may be subjected to forces across a width of a printing media path.

BRIEF DESCRIPTION OF DRAWINGS

Example embodiments will now be described, by way of example only, with reference to the following schematic drawings, in which.

DETAILED DESCRIPTION

Figure 1:
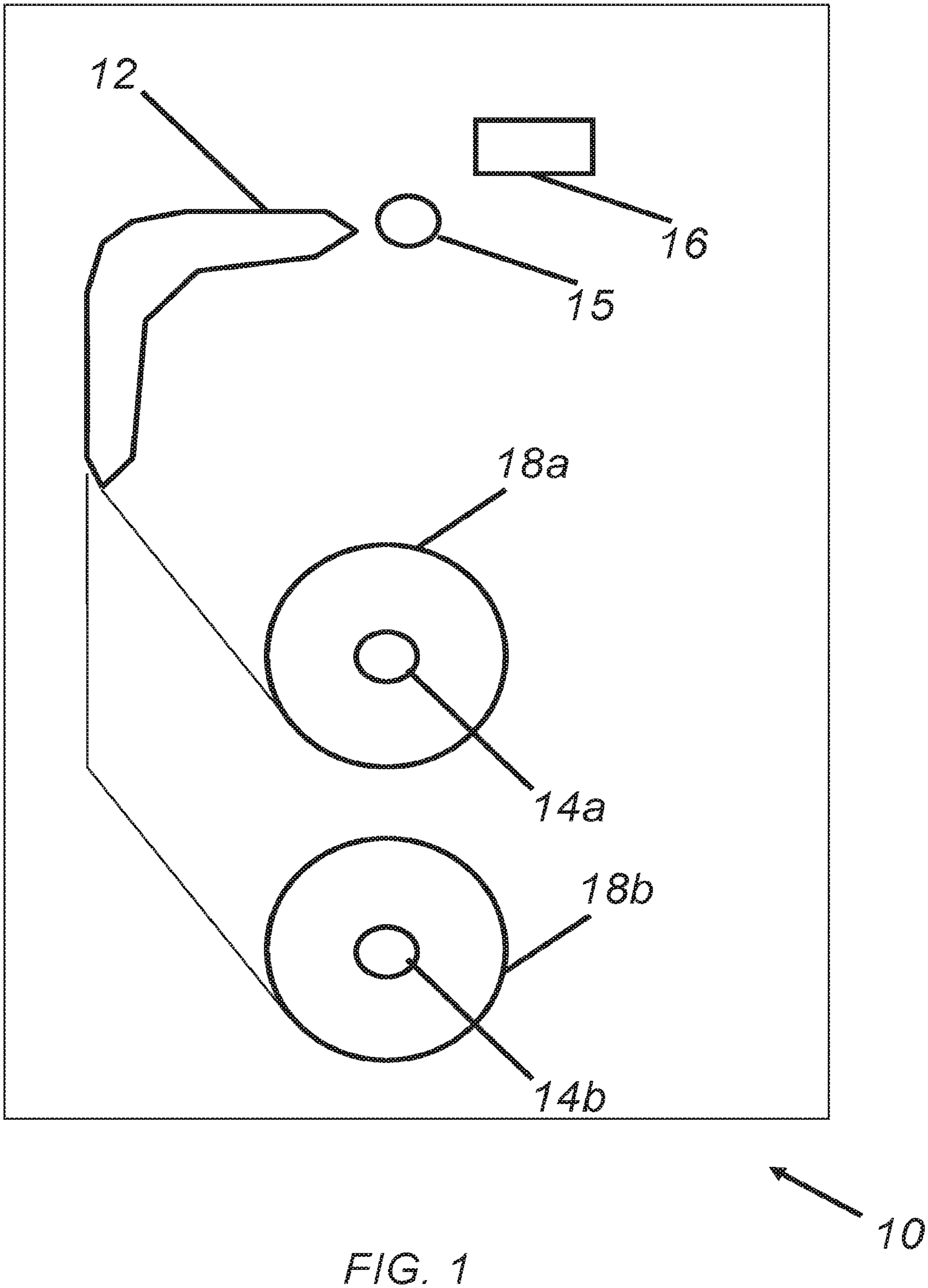
FIGS. 1 and 2 are block diagrams of example printing devices.

FIG. 1 is a block diagram of an example printing device, indicated generally by the reference numeral 10. The printing device 10 is shown in a two-dimensional cross sectional view in FIG. 1. The printing device 10 comprises a modular assembly 12 (for example, a modular spring assembly), and at least one mounting arrangement 14. The modular assembly 12 may comprise a plurality of elastic elements (e.g. springs). Elastic elements can include, amongst others, springs, gas canisters, or any element capable of recovering size and shape after a deformation, for example, a deformation caused by a compressing force.

Details of the modular assembly 12 are discussed below with reference to FIGS. 3 to 6. The printing device 10 may further comprise one or more printheads 16. The printing device 10 may comprise one or more mounting arrangements, for example mounting arrangements **14*a* and 14*b*, for receiving a printing medium, for example, printing mediums 18*a* and 18*b* respectively. The printing mediums 18*a* and 18*b* may be rolls of printing medium (such as rolls of paper) rolled around the mounting arrangements 14*a* and 14*b* respectively. The printing device 10 may further comprise a printing medium advancing roller 15 for causing the printing medium 18 to advance towards the printhead 16. During use, the printing medium 18 may be moved towards the printhead 16 by one or more forces applied to the printing medium 18 such that printing may be performed on the printing medium 18 by the printhead 16. (Note that the printing device 10 may comprise one or more other elements not shown in FIG. 1**).

During a single printing job, a single one of the printing mediums **18*a* and 18*b* may be used for printing such that the single one of the printing mediums 18*a* and 18*b* may be moved towards the printhead 16. For example, a user may choose one of the printing mediums 18*a* and 18*b* (e.g. by choosing a corresponding paper tray) for a particular print job. It should be noted that the provision of two printing mediums 18*a* and 18*b* is not essential to all examples; a single printing medium 18 mounted on a single mounting arrangement 14** may be provided.

Figure 2:
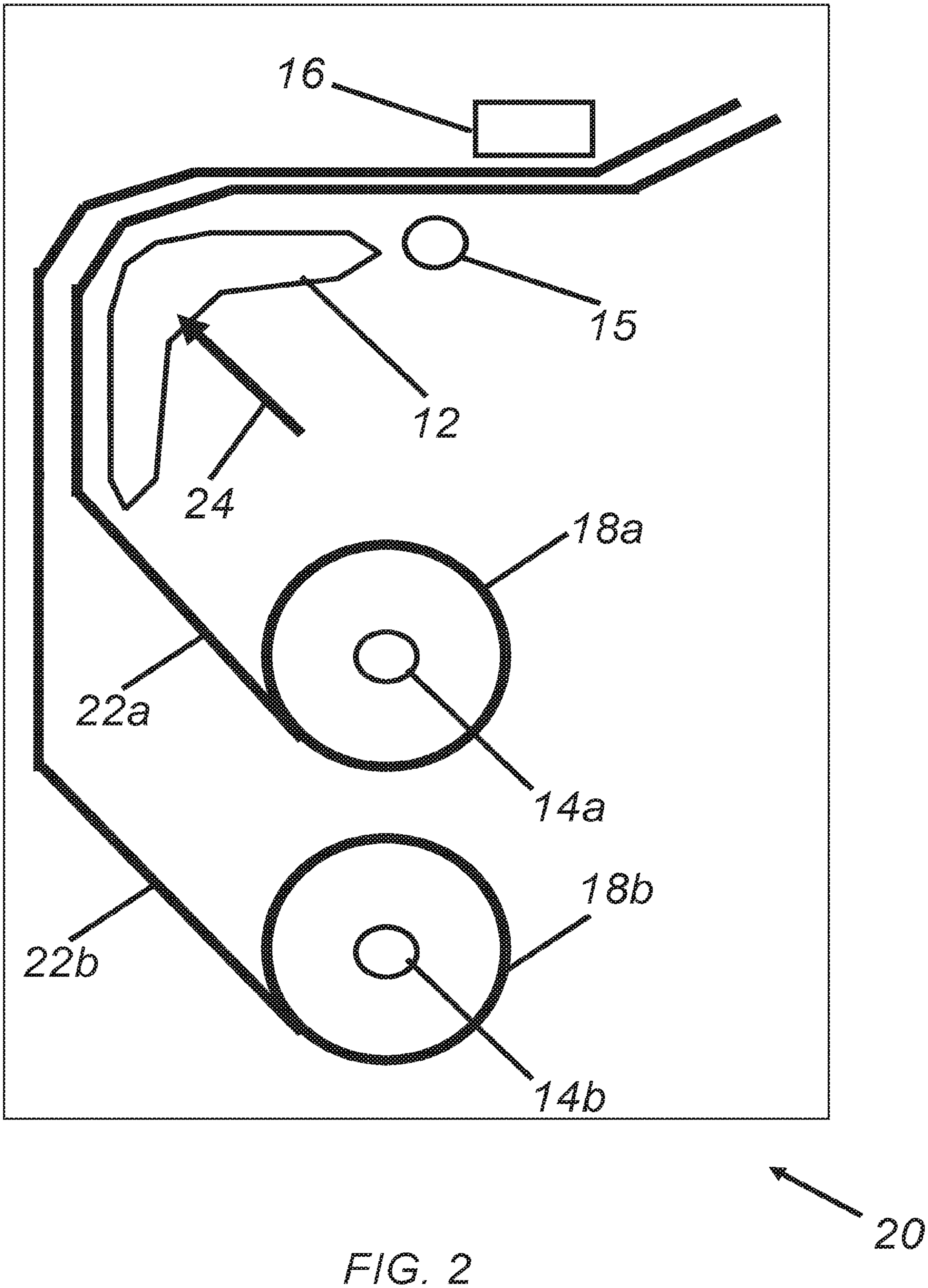

FIG. 2 is a block diagram of an example printing device, indicated generally by the reference numeral 20. The printing device 20 may comprise one or more elements of the printing device 10, such as the modular assembly 12, the mounting arrangements 14, the printing medium advancing roller 15, the printhead 16, and the printing medium 18. The printing device 20 further illustrates at least one printing medium path 22. For example, during use of the printing device 20, the printing medium **18*a* may be movable along the printing medium path 22*a* and the printing medium 18*b* may be movable along the printing medium path 22*b*. The movement of the printing medium 18 may be controllable to position the printing medium 18 relative to the printhead 16 to allow printing on the printing medium 18 by the printhead 16. The printing medium 18 may be moved from the respective mounting arrangement 14 towards the printhead 16 using one or more forces, such as tension forces, applied to the printing medium 18 along a length of the printing medium path 22. For example, the tension forces may comprise a braking force (e.g. caused by a braking action at the mounting arrangement) 14, a gravitational pull, and a pulling force towards the printhead 16 (for example from the printing medium advancing roller 15). Such tension forces may assist in allowing the printing medium 18 to move along the printing media path 22**.

As shown by the printing medium paths 22, the printing medium 18 may pass the modular assembly 12 while moving towards the printhead 16. The modular assembly 12 may comprise a plurality of elastic elements (for example, springs) arranged laterally across a width of the printing medium path 22, such that the elastic elements may each apply a respective elastic force (for example, a spring force) in a direction substantially perpendicular to the printing medium path 12. The respective elastic force may act against a corresponding portion of the printing medium. The elastic force may be represented by the arrow 24. (Note that the width of the printing medium path 22 and the plurality of elastic elements are not viewable in FIG. 2, as this is a cross-sectional view of the printing device 20; also note that the printing device 20 may comprise one or more other elements not shown in FIG. 2).

In an example, one or more of the printing devices 10 or 20 may be a large format printer.

In an example, the printing device may comprise one or more of the modular assemblies 12. One or more of the modular assemblies 12 may be placed in any position along the printing medium path. The effect of one or more elastic elements of a respective modular assembly 12 may be maximized when the modular assembly is placed in a position where the printing medium path changes direction (for example, where, in use, the printing medium bends). The printing medium path may change direction at positions where one or more rollers or guides are placed. In one example, one or more modular assemblies 12 are placed at a positions corresponding to positions of one or more roller assemblies. The direction of the elastic force may be perpendicular to a line across which the printing medium may bend.

Figure 3:
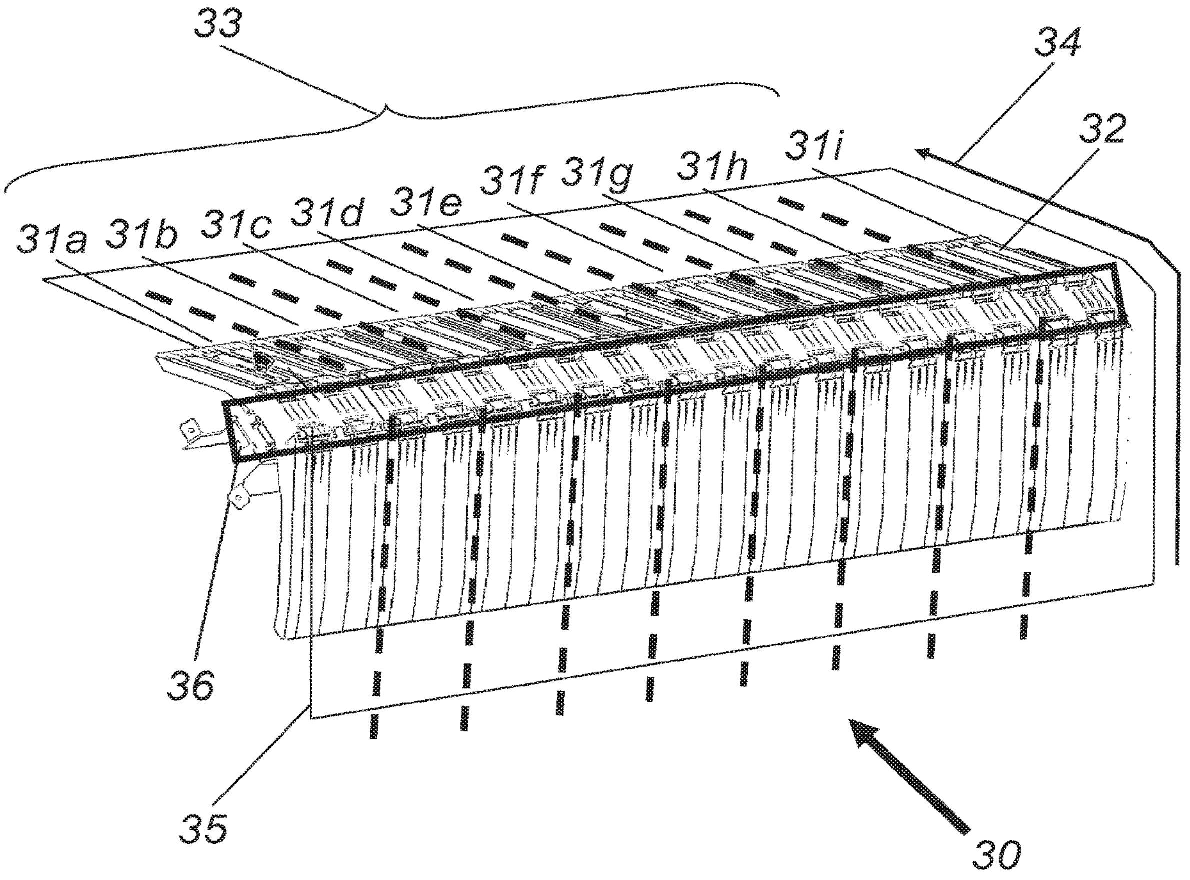
FIGS. 3 to 6 are block diagrams of example systems.

FIG. 3 is a block diagram of an example system, indicated generally by the reference numeral 30. System 30 shows a three-dimensional view of a modular assembly 32 (similar to the modular assembly 12). The modular assembly 32 may comprise a plurality of modules 31*a* to 31*i*. The modules 31 may be arranged laterally across a width 33 of a printing medium path 34 (similar to the printing medium path 22 described above). For example, the printing medium path 34 may be represented by the printing medium 35 moving as indicated by the arrow 34. The separation of each module 31 may be represented by the dotted lines in FIG. 3. The system 30 may further comprise a modular roller assembly 36 mounted on the modular assembly 32. The modular roller assembly 36 may comprise a plurality of rollers arranged laterally across the width 33 of the printing medium path. In one example, one or more of the plurality of rollers of the modular roller assembly are paired with a respective elastic element of the modular assembly. It may be appreciated that a modular assembly 32 may comprise a plurality of modules 31, such that it may comprise more than or fewer than the nine modules 31 shown in FIG. 3.

In an example, during use of the printing device described herein, the printing medium may act against the elastic forces of the respective elastic elements of the modular assembly 32. For example, the printing medium acts against the elastic forces of the respective elastic elements using local tension forces of the printing medium. The printing medium acting against the elastic forces may reduce variations in net forces on the printing medium across the width of the printing medium path. The local tension forces may be caused by one or more forces applied to the printing medium along length of the printing medium path.

During use of the printing device described herein, the printing medium may be subjected to tension forces. Such tension forces may have variations across the width of the printing medium path depending, for example, on alignment of the printing medium. Variations in the tension forces across the width of the printing medium may cause one or more quality issues. For example, if a first local tension force at a right portion of a printing medium is higher than a second local tension force at a left portion of the printing medium, the left portion may move faster than the right portion and the printing medium may tilt towards the right, thus causing lateral movement. The variation in forces and lateral movement of the printing medium may therefore cause wrinkling of the printing medium or cause uneven application of printing fluid to the printing medium by the printhead. The uneven application of the printing fluid may cause dark line banding on a first (e.g. the right) portion of the printing medium as the right portion proceeds in the printing medium path slower than the left portion, and therefore may receive overlap of printing fluid. Similarly a second (e.g. the left) portion may have a lack of printing fluid causing white lines to appear on the left portion. The modular assembly may be used for reducing variations of forces across the width of the printing medium path. Reducing variations of forces across the width of the printing medium may minimize lateral movement of the printing medium.

Referring back to FIG. 3, each of the modules 31 may apply a respective elastic force in a direction substantially perpendicular to the printing medium path 34. As noted above, the local tension forces at each of the modules 31 may have variations; these variations may be at least partially overcome using the elastic force. Initially, the plurality of elastic elements across the modular assembly 32 may be at a default position (for example, partially compressed and/or partially relaxed), and the modules 31 may be aligned. For example, in the above example, the right portion of the printing medium may correspond to the module 31*i*, and the left portion of the printing medium may correspond to the module 31*a*. The local tension forces may have a net direction opposite to the elastic forces. During printing, if the first local tension force at the right portion is higher than the second local tension force at the left portion, the module 31*i* may partially pushed in a direction (for example, downward) of the local tension force, for example by further compression of one or more elastic elements corresponding to the module 31*i*. As the module 31*i* is pushed partially, net forces on the printing medium at the right portion corresponding to the module 31*i* may be reduced to be similar to net forces on the printing medium at the left portion. An arrangement of the modules 31 may then comprise modules 31*a* to 31*h* at a default position, and module 31*i* positioned at least partially downwards relative to the modules 31*a* to 31*h*. It may be appreciated that local tension forces at one or more portions of the printing medium may cause positions of one or more modules 31 to be pushed downward in the direction of the local tension forces. For example, high local tension forces at a portion corresponding to module 31*e* may cause one or more of the modules 31*d*, 31*e* and 31*f* to be pushed downward by similar or different amounts by compression of the respective elastic elements by similar or different amounts. Such modular movement of the modules 31 may assist in reducing variations in net forces across the width of the printing medium path.

In an example embodiment, the positions of the modules, for example the module 31*i*, may be changed back to a default position or to a different position during the printing if the local tension forces at a portion corresponding to the module changes during the printing. For example, assume that the module 31*i* is currently at a position that is downward relative to other modules 31*a* to 31*h* and the elastic elements of module 31*i* is compressed by a higher amount compared to elastic elements of the other modules 31*a* to 31*h*. If the local tension forces at the right portion decreases, and becomes similar to local tension forces at portions corresponding to the modules 31*a* to 31*h*, the elastic elements of module 31*i* may be partially released (to be less compressed or more relaxed) and the position of the module 31*i* may be partially elevated in the direction of the elastic force, for example to a default position or to be aligned with the modules 31*a* to 31*h*.

Figure 4:
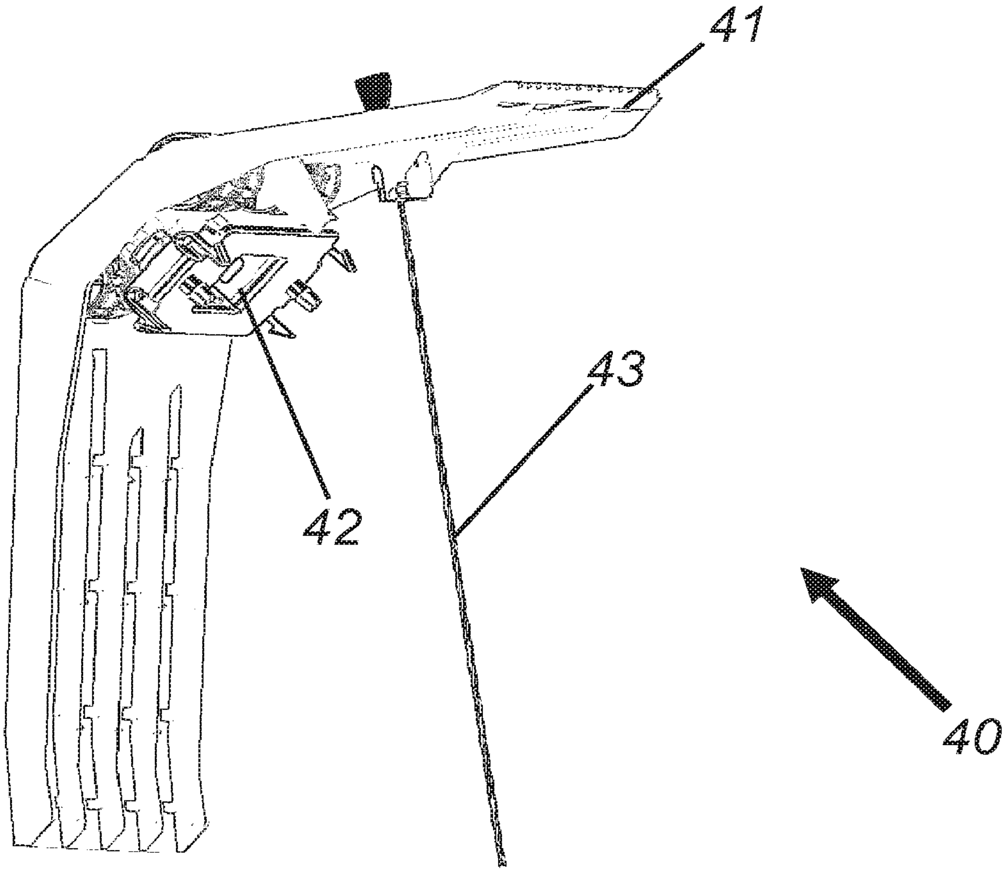

FIG. 4 is a block diagram of an example system, indicated generally by the reference numeral 40. System 40 comprises a module 41 of a modular assembly (e.g. modular assembly 12 and/or 32). The module 41 may comprise a module base 42 and at least one sensor 43. One or more elastic elements may be mounted on the module base 42. The sensor 43 may be used for sensing whether the printing medium is advancing through the printing medium path in an expected manner (for example, staying on the printing medium path). The sensor 43 may also be used for detecting an edge of a printing medium in order to determine dimensions of the printing medium, where the dimensions may be used for adjusting size of any image(s) to be printed on the printing medium. The sensor 43 may be placed on one or more modules (for example module 31*i* of the modular assembly 32) of the modular assembly. Operation of the module 41 is discussed in further detail with reference to FIG. 5.

Figure 5:
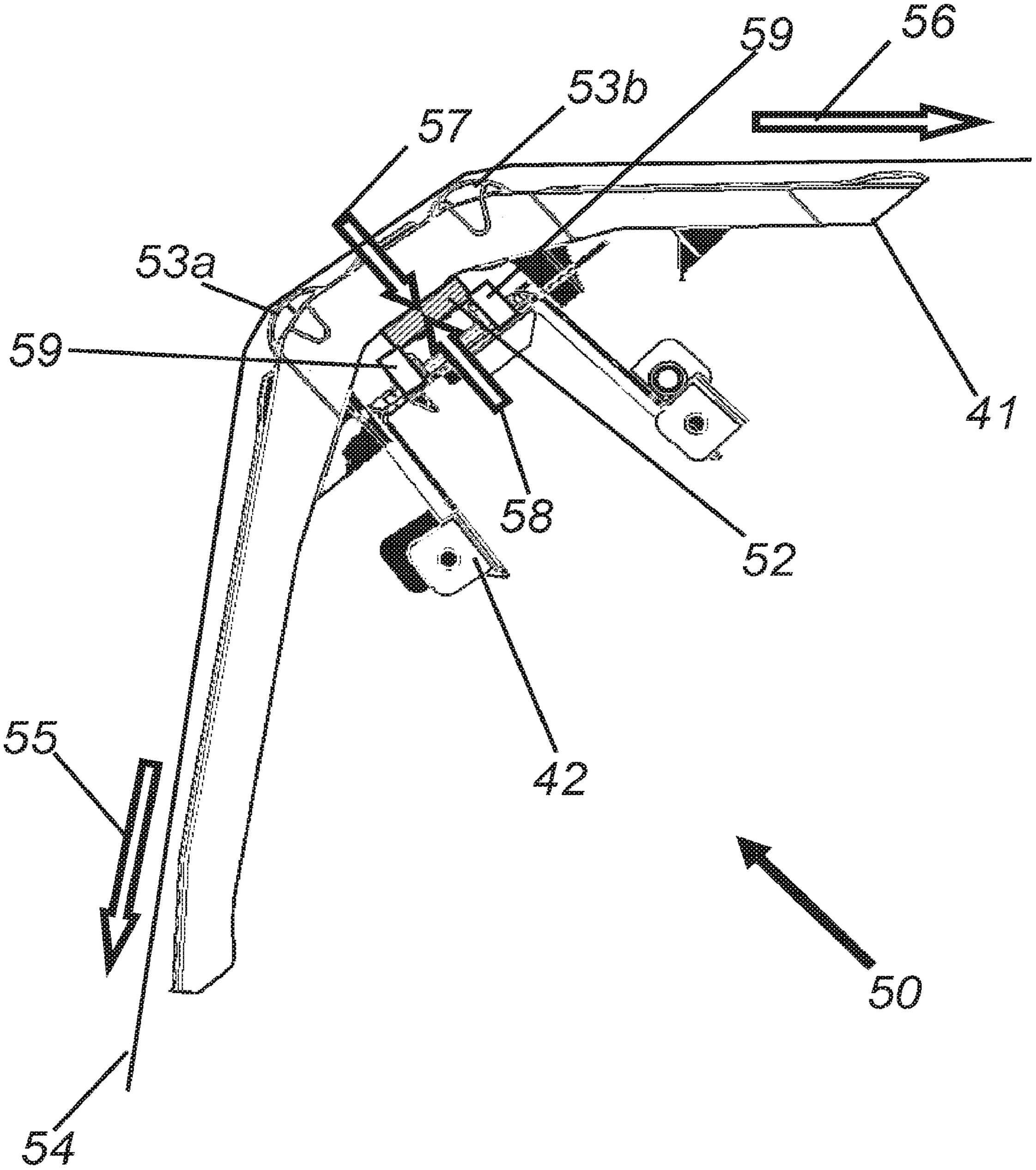

FIG. 5 is a block diagram of an example system, indicated generally by the reference numeral 50. The system 50 comprises the module 41 and the module base 42, as described above. The system 50 further comprises a printing medium 54 moving along a printing medium path. The module 41 comprises at least one elastic element 52, and at least one roller 53 (a pair of rollers 53*a* and 53*b* in this example). The rollers 53*a* and 53*b* may be paired with the elastic element 52. The rollers 53 may assist in smooth movement of the printing medium along modular assembly in the printing medium path. One or more forces 55 and 56 may be applied to the printing medium 54 along the length of the printing medium path. The elastic element 52 may apply an elastic force 58 (e.g. a spring force) in a direction substantially perpendicular to the printing medium path. A resultant of the one or more forces 55 and 56 may be a local tension force 57 acting in a direction opposite to a direction of the elastic force 58.

In an example, one or more of the plurality of elastic elements of the modular assembly, for example the elastic element 52, may be at least partially relaxed and/or at least partially compressed in a default setting of the modular assembly. During use of the modular assembly (for example during printing), if local tension force 57 is relatively high (e.g. relative to local tension forces in portions corresponding to other modules (shown in FIG. 3)), the elastic element 52 may be compressed at least partially such that the module 41 is pushed partially in a direction (downward) of the local tension force 57 in order to overcome at least part of the local tension force 57. If the local tension force 57 then decreases (e.g. to become similar to local tension forces in portions corresponding to other modules), the elastic element 52 may be released at least partially such that the module 41 is pushed partially in a direction of the elastic force 58. As such, if the local tension force 57 is larger than an elastic constant (e.g. a spring preload) of the elastic element 52 (e.g. a spring), the elastic force 58 (e.g. a spring force) of the elastic element 52 may at least partially be overcome. In an example, a respective elastic constant of each respective elastic element is selected such that the elastic force of the respective elastic element is at least partially overcome when a respective local tension force applied by the printing medium is larger than the respective elastic constant.

In an example, one or more modules, such as the module 41, of the modular assembly may comprise one or more stoppers 59 for one or more respective elastic elements, such as the elastic element 52. The one or more stoppers 59 may be configured to limit the elastic force 58 of the elastic element 52 to a threshold, by limiting an extent to which the elastic element 52 may be compressed or released in response to the local tension force 57.

Figure 6:
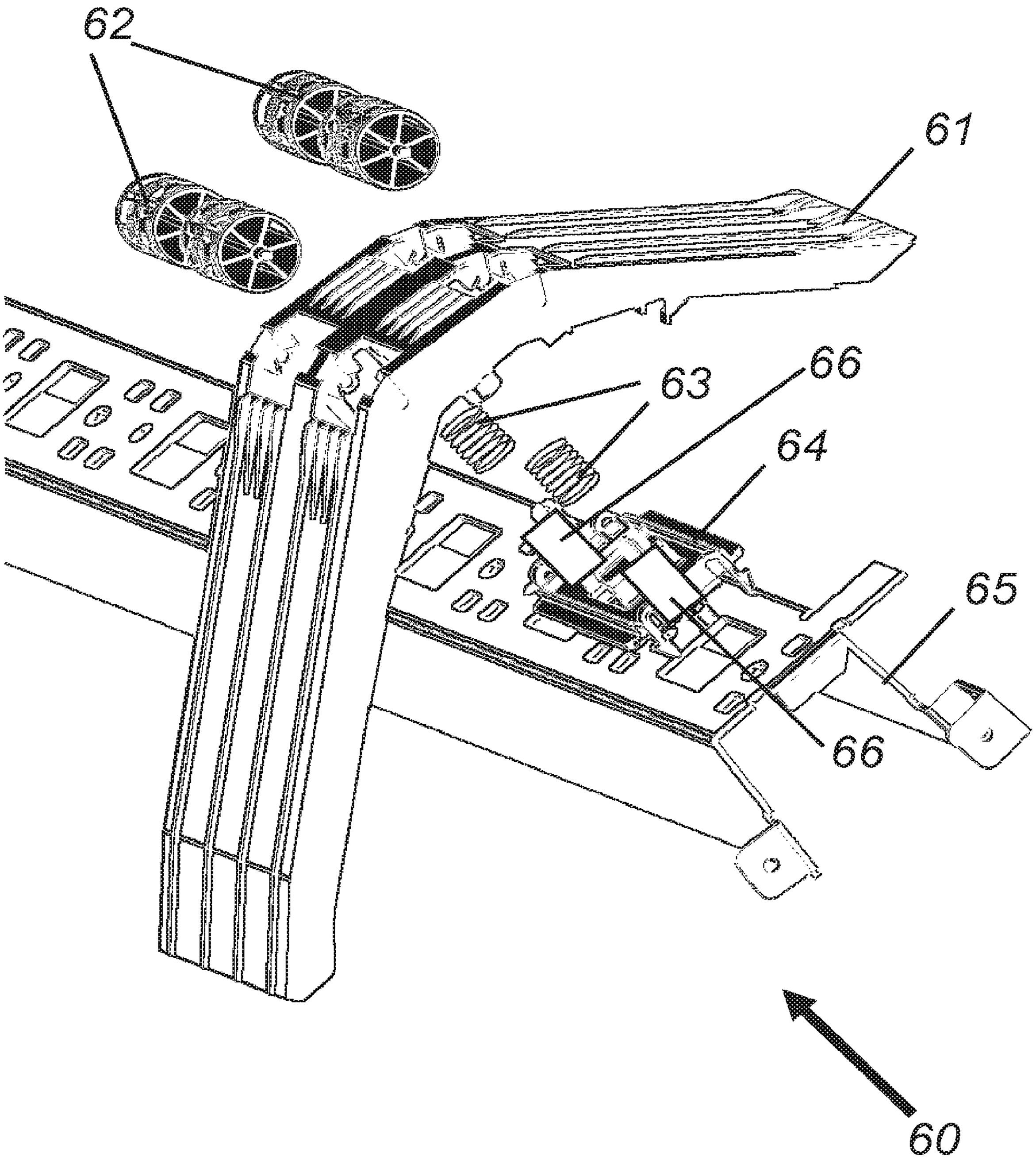

FIG. 6 is a block diagram of an example system, indicated generally by the reference numeral 60. System 60 illustrates an exploded view of the modular assembly showing an example order of assembly of one or more elements of the modular assembly. System 60 comprises an example module 61, one or more rollers 62, one or more elastic elements 63, a module base 64, a beam support 65, and one or more stoppers 66 for one or more respective elastic elements 63. The one or more stoppers 66 may be mounted on the module base 64. As shown in system 60, the rollers 62 may, for example, be placed on a top surface of the modular assembly to form a modular roller assembly. As such, compression or release of the elastic elements 63 may cause the module 61, along with the rollers 62 to move in a direction of elastic forces of the elastic elements 63. The modular assembly comprising a plurality of modules 61 may be supported by the beam support 65. The beam support 65 may comprise a beam with at least a length corresponding to a width (such as width 33) of a printing medium path, which width may also be a width of the modular assembly. As such, the beam support 65 may be arranged across the width of the printing medium path. The elastic element 63 may be mounted on the module base 64 towards an inner surface of the module 61.

Figure 7:
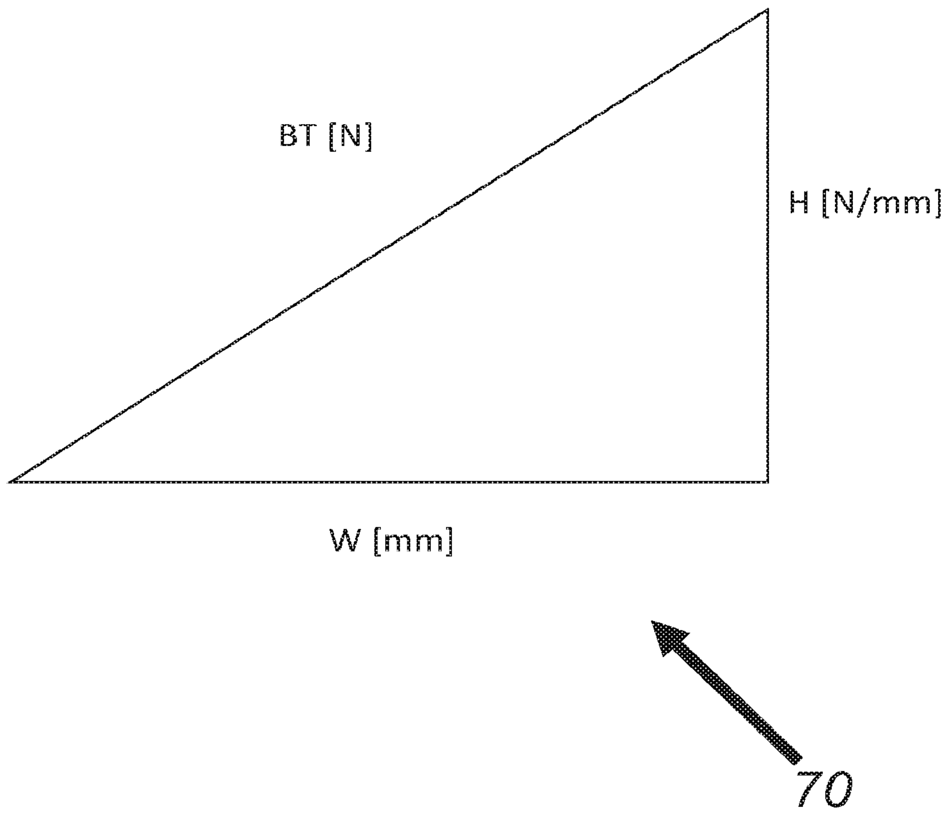
FIG. 7 is a representation of a triangular stress profile in accordance with an example.

FIG. 7 is a representation of a triangular tension profile, indicated generally by the reference numeral 70, in accordance with an example. In an example embodiment, the number of elastic elements and dimensions of the plurality of elastic elements in a modular assembly may be configured based on a triangular media stress profile. The dimensions of the elastic elements may affect the elastic constant of the elastic elements (e.g. the maximum preload that the elastic elements may have). The number of elastic elements in each module may affect an extent to which the module may move and an extent to which the module may assist in overcoming local tension forces. The number of elastic elements in each module and the number of elastic elements across the modular assembly may affect an overall flexibility in movement of the modular assembly, and variations in possible movement across the plurality of the modules of the modular assembly. The higher the variations in possible movement across the plurality of the modules, the more the modular assembly may assist in reducing the variations in net forces on the printing medium across the width of the printing medium. Therefore, the number and dimensions of the elastic elements that the modular assembly may have is determined using a worst case scenario of tension on the printing medium, represented by the triangular tension profile 70.

For example, the printing medium may initially be partially skewed (e.g. not entirely aligned with the printing medium path). When the skewed printing medium advances in the printing medium path, the skewed paper may tend to move laterally in order to compensate for the misalignment. As some lateral forces in the direction of the width of the printing medium path may be applied to the printing medium, one or more elastic elements may be at least partially compressed and/or released (compared with a default position) to at least partially overcome local tension forces on the printing medium and therefore reduce variations in net forces. The modules may be pushed downward or upward by partial compression or relaxation of the elastic elements in order to cause rotation of the printing medium for aligning the printing medium with the printing medium path. A maximum rotation that may be required may thus depend on a maximum possible error in alignment of the printing medium which is represented by the triangular tension profile 70.

The triangular tension profile 70 may represent the worst case scenario of initial misalignment of the printing medium (for example at a maximum level of tolerance). It is desired that the tension profile (for example net forces) across the width of the printing medium is substantially symmetrical. The misalignment is partially overcome with lateral control (e.g. steering) of the printing medium, and the elastic elements of the modular assembly may not interfere with the lateral control. The maximum level of misalignment may be used to define the elastic constant (e.g. preload of the elastic elements). In the triangular tension profile 70, W (example unit millimetres (mm)) may represent the width of the printing medium, H ((example unit Newton per millimetre (N/mm)) may represent the maximum tension per unit of width in the maximum level of tolerance of the misalignment; and BT (example unit Newton (N)) may represent an area of a triangle showing one or more forces applied to the printing medium (for example braking forces and/or pulling forces applied by the mounting arrangement 14 and/or the printing medium advancing roller 15).

Figure 8:
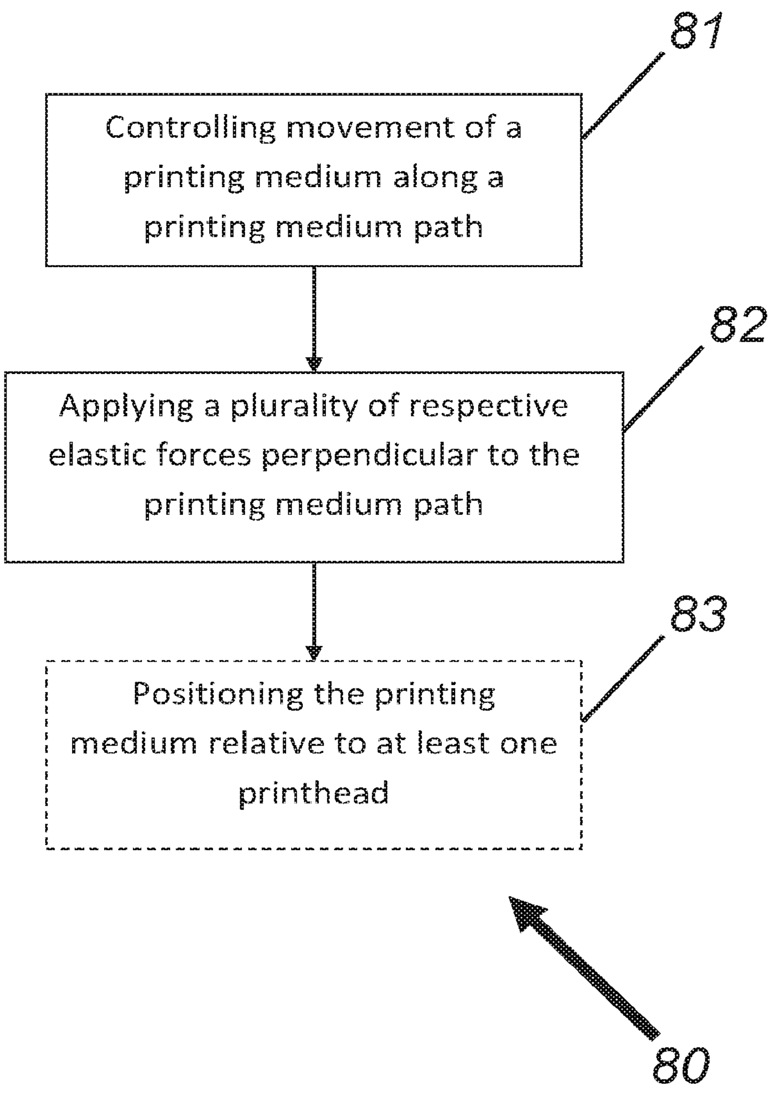
FIGS. 8 to 11 are flowcharts showing algorithms in accordance with examples.

FIG. 8 is a flowchart of an algorithm, indicated generally by the reference numeral 80, in accordance with an example. The algorithm 80 starts with operation 81 for controlling movement of a printing medium (18, 35, 54) along a printing medium path (22, 34). Controlling the movement of the printing medium may cause local tension forces to be applied to the printing medium along a length of the printing medium path. At operation 82, a plurality of respective elastic forces may be applied to a corresponding portion of the printing medium in a direction perpendicular to the printing medium path. The respective elastic forces may be applied by a plurality of elastic elements (52, 63) of a module (41, 61) of a modular assembly (12, 32), wherein the modular assembly may be arranged laterally across a width (33) of the printing medium path. The printing medium may act against the elastic forces of the respective elastic elements (52, 63) of the modular assembly (12, 32). For example, the printing medium may act against the elastic forces using local tension forces in order to reduce variations in net forces on the printing medium across the width of the printing medium. The local tension forces may be caused by one or more forces applied to the printing medium along length of the printing medium path. At (optional) operation 83, the printing medium may be positioned relative to at least one printhead (16) to allow printing on the printing medium by the at least one printhead.

Figure 9:
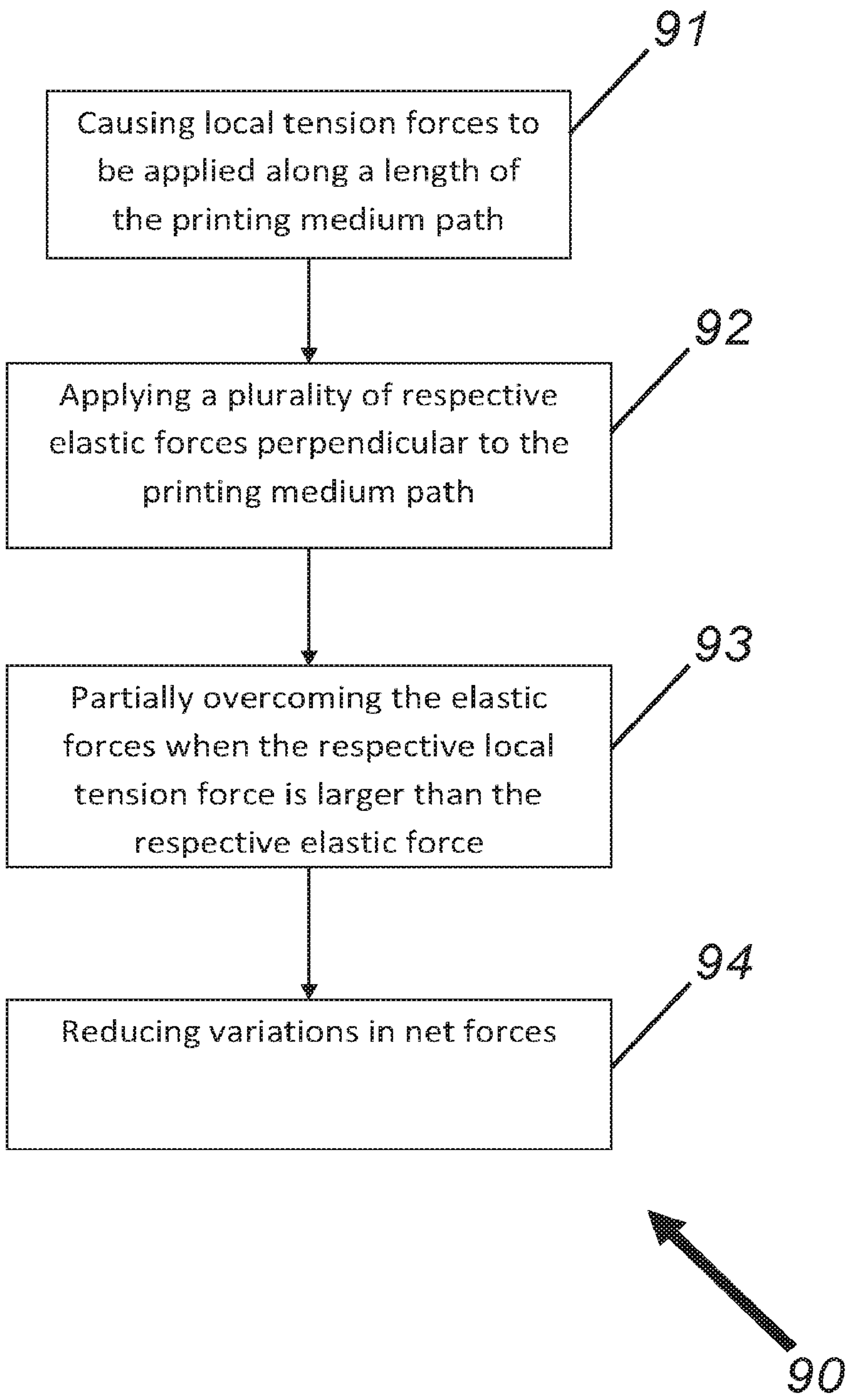

FIG. 9 is a flowchart of an algorithm, indicated generally by the reference numeral 90, in accordance with an example. The algorithm 90 starts with operation 91 for causing local tension forces to be applied to a printing medium along a length of the printing medium path. The local tension forces on the printing medium may be caused by a combination of a downward pull (e.g. braking force) from a mounting arrangement (14) and a pull towards the direction of one or more printheads from a printing medium advancing roller (15). The pull towards the printheads may be caused by a braking mechanism applied to the printing medium. The local tension forces may assist in controlling movement of the printing medium, and minimizing lateral movement of the printing medium. At operation 92 (similar to operation 82), a plurality of respective elastic forces may be applied in a direction perpendicular to the printing medium path. At operation 93, if a respective local tension force is larger than a respective elastic force, the respective elastic force may at least partially be overcome. At operation 94, the local tension forces acting against the respective elastic forces may reduce variations in net forces on the printing medium across the width of the printing medium path. In an example, reducing variations in the net force may minimize lateral movement of the printing medium. Reducing variations in net forces may comprise one or more effects discussed below with reference to FIG. 10.

Figure 10:
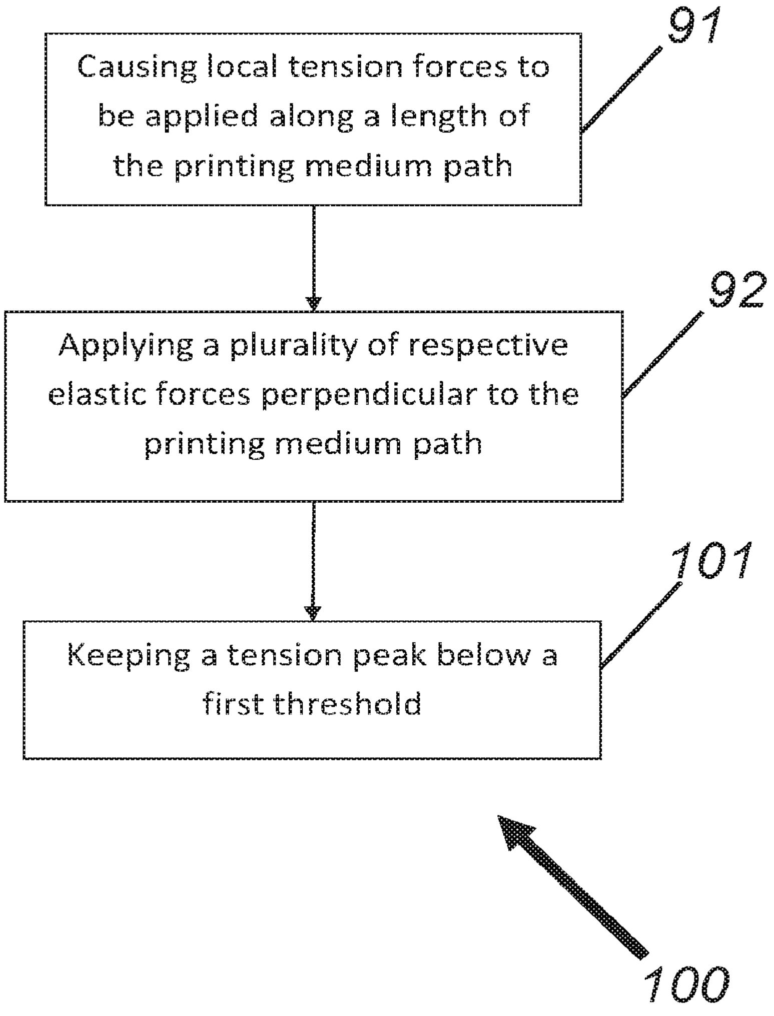

FIG. 10 is a flowchart of an algorithm, indicated generally by the reference numeral 100, in accordance with an example. Operations 91 and 92 may be performed as described above with reference to FIG. 9. At operation 101, the algorithm 100 keeps a tension peak below a first threshold in order to reduce variations in the net forces along the width of the printing medium path. The printing medium acting against the elastic forces comprises keeping the tension peak below the first threshold. As discussed above, the printing medium acting against the elastic forces may reduce variations in net forces along the width of the printing medium path, and reducing variations in the net forces may improve image quality of the printing. During use of the printing device, as the printing medium advances from a printing medium roll towards a printhead, the local tension forces may cause tension peaks to arise on one or more portions across the width of the printing medium. Such tension peaks may cause lateral movement of the printing medium, which may negatively affect the image quality. The tension peaks may, for example, arise due to eccentricities of a printing media roll mounted on the mounting arrangements. Therefore, by positioning the modules across the width of the printing medium path, the tension peaks can be kept below the first threshold. The first threshold value may be determined based on the triangular tension profile 70 of FIG. 7 (e.g. the first threshold may be H times the width of the printing medium per). As such the first threshold value may correspond to the maximum rotation and maximum possible error that may be compensated for by the modular assembly.

Figure 11:
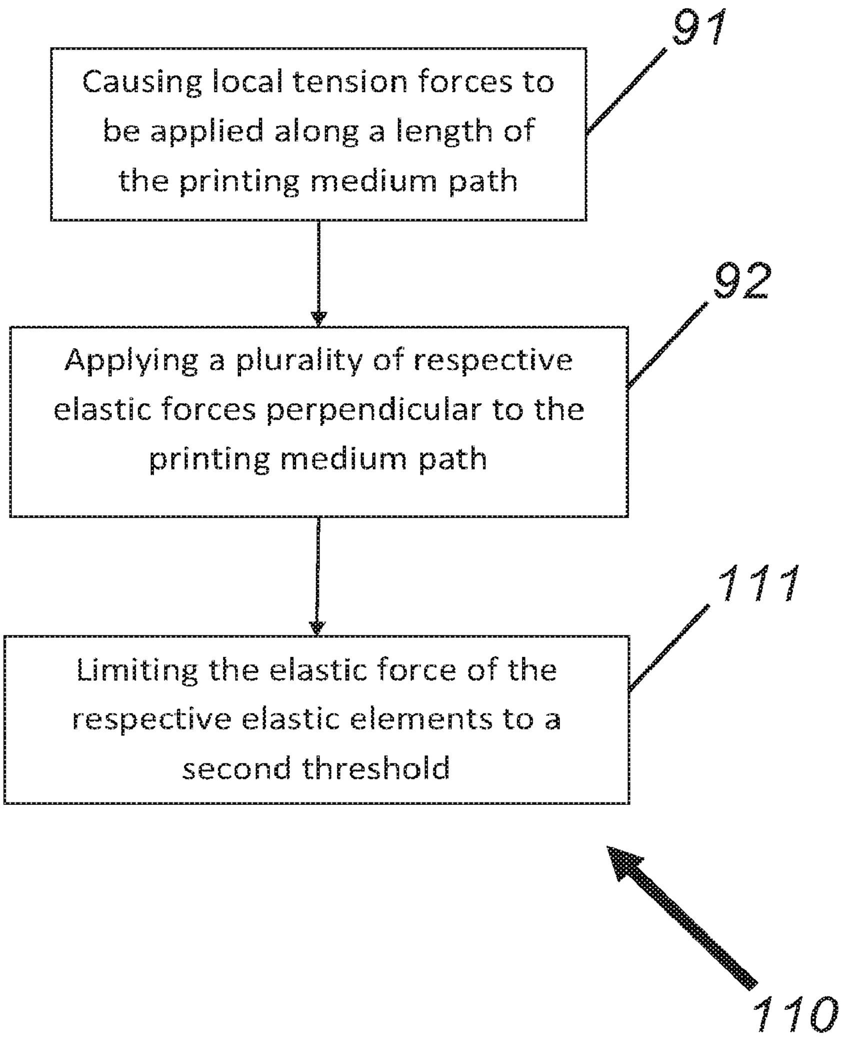

FIG. 11 is a flowchart of an algorithm, indicated generally by the reference numeral 100, in accordance with an example. Operations 91 and 92 may be performed as described above with reference to FIG. 9. At operation 111, the elastic force of the respective elastic elements applied to a corresponding portion of the printing medium may be limited to a second threshold. The modular assembly may comprise one or more stoppers for one or more respective elastic elements for limiting the elastic force of the one or more respective elastic elements. For example, in order for the printing medium to be movable along the printing medium path and to avoid wrinkles in the printing medium, there should be a net tension force that tightens a hold of the printing medium and prevents the printing medium from becoming loosely held. Therefore, even though the elastic elements may be used for reducing variations in the net forces, the net forces may be desired to cause tension across the width of the printing medium path. Thus the elastic forces may be limited by the stoppers such that the elastic forces may not cancel out the local tension forces completely.

If desired, the different functions discussed herein may be performed in a different order and/or concurrently with each other. Furthermore, if desired, one or more of the above-described functions may be optional or may be combined.

It is also noted herein that while the above describes various examples, those description should not be viewed in a limiting sense. Rather, there are several variations and modification which may be made without departing from the scope of the present invention, as defined in the appended claims.

The invention claimed is:

1. A printing device comprising:

a plurality of modules; and a plurality of elastic elements arranged laterally across a width of a printing medium path to guide a printing medium toward a printhead, each of the plurality of elastic elements to apply an elastic force to a corresponding one of the plurality of modules in a direction substantially perpendicular to the printing medium path, wherein the plurality of modules are disposed between the printing medium path and the plurality of elastic elements to prevent the plurality of elastic elements from contacting a printing medium moving along the printing medium path.

2. The printing device of claim 1, wherein:

each of the plurality of modules is arranged to contact the printing medium; and the elastic force applied by respective ones of the plurality of elastic elements are to act against tension forces applied by the printing medium as the printing medium moves along the printing medium path.

3. The printing device of claim 2, wherein the elastic forces applied by the plurality of elastic elements are to reduce variations in tension forces applied by different portions of the printing medium as the printing medium moves along the printing medium path.

4. The printing device of claim 3, wherein the reduction in variation of the tension forces rotate the printing medium to align the printing medium with the printing medium path.

5. The printing device of claim 3, wherein:

the tension forces applied by the different portions of printing medium compress the plurality of elastic elements, and corresponding ones of the plurality of modules are to move in a downward direction when the plurality of elastic elements compress.

6. The printing device of claim 1, wherein each of the plurality of modules includes:

a module base including a respective one of the plurality of elastic elements; and a sensor to sense whether the printing medium is moving along the printing medium path.

7. The printing device of claim 1, wherein each of the plurality of modules includes at least one roller to contact the printing medium as the printing medium moves along the printing medium path.

8. The printing device of claim 7, wherein:

each of the plurality of modules includes a stopper, and the stopper is to limit the force applied by a respective one of the elastic elements.

9. The printing device of claim 1, wherein the elastic forces of the plurality of elastic elements are applied to maintain a tension peak below a first threshold.

10. The printing device of claim 9, wherein each of the plurality of modules includes a stopper for a respective one of the plurality of elastic elements, wherein the stopper is to limit the elastic force applied by the respective one of the plurality of elastic elements to a second threshold.

11. The printing device of claim 1, wherein each of the plurality of modules is to move independently from remaining ones of the plurality of modules.

* * * * *